(12) United States Patent
Kent et al.

(10) Patent No.: US 11,648,744 B2
(45) Date of Patent: May 16, 2023

(54) ASSEMBLY AND METHOD FOR ON-SITE PRESSING OF HYDROELECTRIC GENERATOR FIELD POLES

(71) Applicant: ANDRITZ HYDRO CORP., Charlotte, NC (US)

(72) Inventors: Samuel Riley Kent, Davidson, NC (US); Steven Parker, Charlotte, NC (US); Nathan Steele, Concord, NC (US); Lewis Hulbert Morgan, Wenatchee, WA (US); Bernard Cantin, Charlotte, NC (US); Thomas C. Coulson, Connell, WA (US)

(73) Assignee: ANDRITZ HYDRO CORP., Charlotte, NC (US)

( * ) Notice: Subject to any disclaimer, the term of this patent is extended or adjusted under 35 U.S.C. 154(b) by 19 days.

(21) Appl. No.: 17/371,667

(22) Filed: Jul. 9, 2021

(65) Prior Publication Data
US 2023/0011857 A1 Jan. 12, 2023

(51) Int. Cl.
| | |
|---|---|
| *B30B 1/34* | (2006.01) |
| *B21D 3/10* | (2006.01) |
| *B21D 3/16* | (2006.01) |
| *B30B 7/02* | (2006.01) |
| *B30B 15/16* | (2006.01) |
| *B30B 15/30* | (2006.01) |
| *B30B 15/00* | (2006.01) |

(52) U.S. Cl.
CPC .................. *B30B 1/34* (2013.01); *B21D 3/10* (2013.01); *B21D 3/16* (2013.01); *B30B 7/023* (2013.01); *B30B 7/026* (2013.01); *B30B 15/16* (2013.01); *B30B 15/0052* (2013.01); *B30B 15/30* (2013.01)

(58) Field of Classification Search
CPC ... B21D 3/10; B21D 3/16; B21D 1/14; B21D 3/14; B30B 1/34; B30B 7/023; B30B 7/026; B30B 15/16; B30B 15/0052; B30B 15/30
USPC ........................................................ 72/31.03
See application file for complete search history.

(56) References Cited

U.S. PATENT DOCUMENTS

| | | | | |
|---|---|---|---|---|
| 4,138,876 A | * | 2/1979 | Chisum | B21D 1/14 901/41 |
| 4,903,520 A | * | 2/1990 | Hukkanen | C25C 7/06 72/472 |

FOREIGN PATENT DOCUMENTS

| | | | |
|---|---|---|---|
| CN | 201544013 | * | 8/2010 |
| CN | 201863279 | * | 6/2011 |

OTHER PUBLICATIONS

CN201544013U Li, et alia (Aug. 11, 2010) MT (Year: 2010).*
CN201863279U Chen (Jun. 15, 2011) MT (Year: 2011).*
Facilities Instructions, Standards, and Techniques vol. 2-7 (Jul. 1994) (Year: 1994).*

* cited by examiner

*Primary Examiner* — Shelley M Self
*Assistant Examiner* — Fred C Hammers
(74) *Attorney, Agent, or Firm* — Kilpatrick Townsend & Stockton LLP

(57) ABSTRACT

On-site pressing of field poles for a hydroelectric generator is provided. A field pole may be placed on a press cart and press bars may be placed on top of the field pole. The press cart is moved along a track to transport the field pole to a pressing unit. Hydraulic cylinders in the pressing unit press the field pole and the press bars between the cart and a top plate of the pressing unit to straighten the field pole.

16 Claims, 8 Drawing Sheets

ASSEMBLY AND METHOD FOR ON-SITE PRESSING OF HYDROELECTRIC GENERATOR FIELD POLES

TECHNICAL FIELD

The present disclosure relates generally to the repair of field poles used in hydroelectric generators. More particularly, but not by way of exclusion, this disclosure relates to the on-site pressing of field poles of a hydroelectric generator.

BACKGROUND

Hydroelectric generators produce electrical energy using a renewable resource and without combusting fossil fuels. A turbine converts kinetic energy from flowing water into mechanical energy. A shaft connected to the turbine transmits the mechanical energy to a rotor in a generator. The rotor may include field poles mounted around the perimeter of the rotor. The field poles may include steel pole bodies surrounded by copper coils. As the rotor turns, the field poles move past the conductors in the stator and generate electricity, thereby converting the mechanical energy into electrical energy. The generated electricity may then be transferred for further processing, storage, or distribution.

At some point, the field poles may require repairs to straighten the field poles. Such repairs are generally very time consuming since they require transporting the field poles to an offsite location for pressing and then transporting the field poles back to the site for reinstallation on the rotor.

SUMMARY

Some aspects of the present invention enable a more efficient method for pressing field poles. The method utilizes an on-site pressing assembly, which includes one or more pressing carts, a track, and a pressing unit. A field pole is removed from the rotor and placed on a pressing cart. One or more press bars are placed on top of the field pole. The cart carrying the field pole and the press bars is transported into the pressing unit. The pressing unit includes hydraulic cylinders that exert an upwards force on the bottom of the cart so that the field pole and the press bars are pressed between the cart and a top plate of the pressing unit. Spacers or shims may be placed between the upper surface of the cart and the field pole as needed to facilitate the straightening.

In some situations multiple pressings may be required. Multiple pressings may include multiple pressings of the field pole or may include one or more pressings of the field pole in combination with one or more pressings of the pole body separated from the pole coil, and/or one or more pressings of the pole coil separated from the pole body.

Alternatively, instead of pressing the field pole, the method may include separating the pole body and the pole coil, separately pressing one or both of the pole body and/or the pole coil, and reassembling the pole body and the pole coil.

The method includes the processing of multiple field poles, pole bodies, and/or pole coils using multiple press carts.

These and other features, aspects, and advantages of the present disclosure are better understood when the following Detailed Description is read with reference to the accompanying drawings.

DETAILED DESCRIPTION

Figure 1:
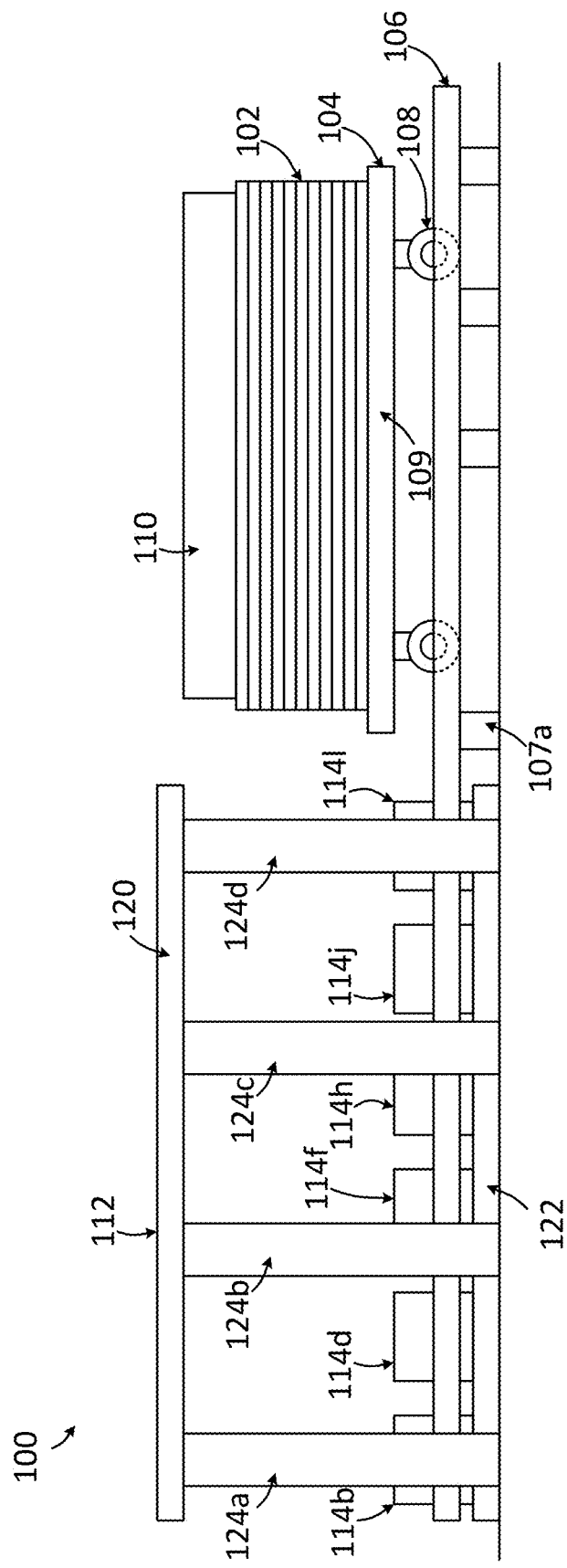
FIG. 1 is a side view of an exemplary pole pressing assembly including a pressing unit, a press cart, and a track in accordance with an aspect of the present disclosure.

The following detailed description of the preferred embodiments is presented only for illustrative and descriptive purposes and is not intended to be exhaustive or to limit the scope of the invention. The examples were selected and described to best explain the principles of the invention and its practical application. One of ordinary skill in the art will recognize that many variations can be made to the invention disclosed in this specification without departing from the scope and spirit of the invention.

Corresponding reference characters indicate corresponding parts throughout the several views. Although the drawings represent examples of various features and components according to the present disclosure, the drawings are not necessarily to scale and certain features may be exaggerated in order to better illustrate embodiments of the present disclosure, and such exemplifications are not to be construed as limiting the scope of the present disclosure in any manner.

Although specific terms are used in the following description for the sake of clarity, these terms are intended to refer only to the particular structure selected for illustration in the drawings, and are not intended to define or limit the scope of the disclosure.

The singular forms "a", "an", and "the" include plural referents unless the context clearly indicates otherwise. Numerical values should be understood to include numerical values which are the same when reduced to the same number of significant figures and numerical values which differ from the stated value by less than the experimental error of conventional measurement technique of the type described in the present application to determine the value.

It should be noted that many of the terms used herein are relative terms. For example, the terms "upper" and "lower" are relative to each other in location, i.e. an upper component is located at a higher elevation than a lower component in a given orientation, but these terms can change if the device is flipped.

The terms "top" and "bottom" or "base" are used to refer to locations/surfaces where the top is always higher than the bottom/base relative to an absolute reference, i.e. the surface of the Earth. The terms "upwards" and "downwards" are also relative to an absolute reference.

Components of hydroelectric generators, including rotor assemblies, may require repair after installation or use. Over time the field poles attached to the rotor can become deformed. The deformation may be the result of slippage or fanning between the laminated sheets that form the body of the field pole. Existing methods to address the deformation require removing the field poles from the rotor and shipping the field poles offsite to a facility that can press the field poles to within a desired tolerance of straightness. After the field poles are pressed, they are returned to the site and reinstalled. These existing methods typically require 3-5 months to process the field poles from a hydroelectric generator.

A field pole may include a pole body and a pole coil. The pole body includes one or more pole attachment pieces that extend from the surface of the pole body that faces the rotor. The pole attachment pieces attach the field poles to the rotor. The exemplary pole bodies illustrated herein have two pole attachment pieces, each with a generally T-shaped cross section. Other types and shapes of attachment pieces are possible and can be pressed using the pressing assembly and methods described herein. The pole coil surrounds the outer perimeter of the pole body. It may include a number of coils and may also include connector pieces to connect to adjacent pole coils.

Using the methods and structures described herein, the time required to press field poles can be greatly reduced by using a system located proximate to the hydroelectric generator. The field poles can be removed from the rotor of the hydroelectric generator, pressed on site, and then reinstalled on the rotor. In one example, the on-site process was able to press ten to twelve poles per shift. The method may be used to press the field pole without separating the pole body from the pole coil, to press the pole body separated from the pole coil, or to press the pole coil separated from the pole body. One or more of these types of pressings may be used in combination.

The methods and systems of the present disclosure are now described in greater detail with reference to FIGS. 1-7.

Figure 2:
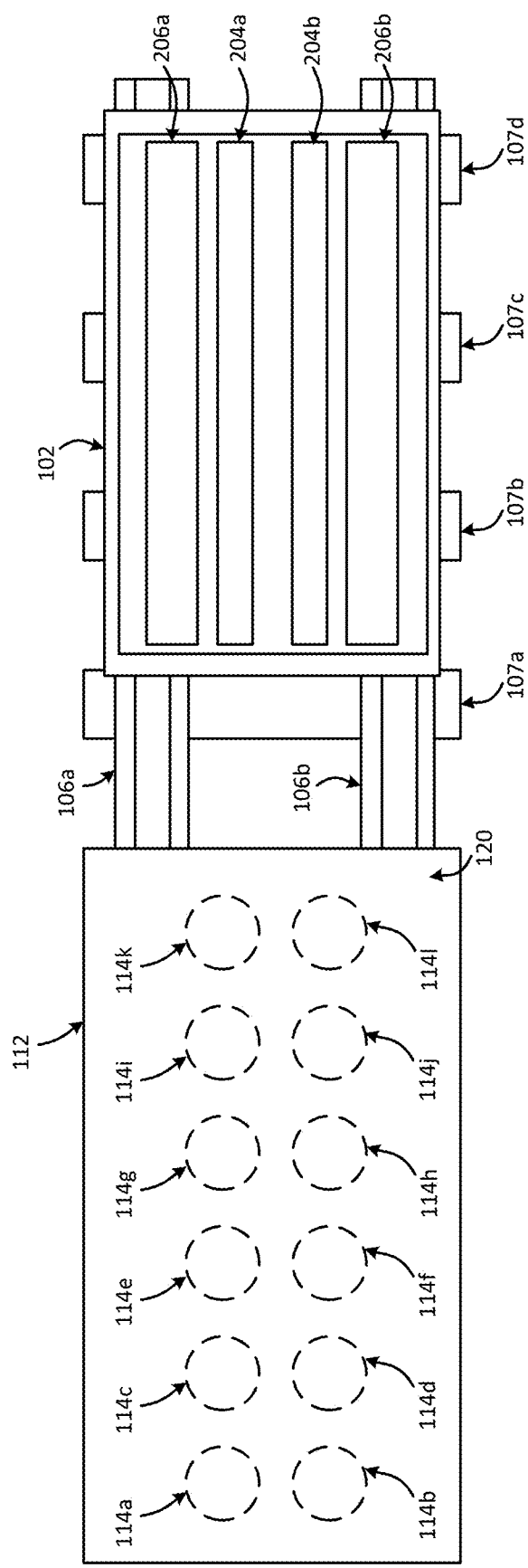
FIG. 2 is a top view of the pole pressing assembly of FIG. 1, in accordance with an aspect of the present disclosure.

FIG. 1 is a side view of a pole pressing assembly 100 which is installed at the site of a hydroelectric generator. The pole pressing assembly includes a pressing unit 112, at least one press cart 104, and a track 106. FIG. 2 is a top view of the pole pressing assembly of FIG. 1

The track 106 shown in FIGS. 1 and 2 may include two parallel tracks 106a, 106b supported by a number of cross bars 107a-d. In one example, each of the parallel tracks has a base portion and two side portions that extend upwards from the base portion. Although not shown in FIGS. 1 and 2, the track 106 can extend beyond both ends of the pressing unit 112 so that multiple press carts 104 can be located on the track 106 at the same time. For example, one press cart may be located at a first position on the track and may carry a field pole that has not been pressed, a second press cart may be located at a second position on the track within the pressing unit, and a third press cart may be located at a third position on the track on an opposite side of the pressing unit from the first position and may carry a field pole that has been pressed and is ready to be reinstalled on the rotor.

Additional or alternative tracks may also be used. For example, multiple tracks may converge into the track before or after the track extends into the pressing unit or a different track configuration may be used.

Each press cart 104 includes a base 109 and a number of wheels 108. In one example, the base is generally rectangular and a set of wheels is located below the base in each corner area of the base. The figures illustrate an example where each set of wheels includes two wheels. Each set of wheels fits within one of the parallel tracks so that the wheels fit within the side portions of the tracks. Other configurations for the press cart are also possible.

The pressing unit 112 includes a top plate 120, a base plate 122, multiple side supports 124a-d, and a number of hydraulic cylinders 114a-j. The hydraulic cylinders may be collectively referenced as 114. The side supports extend between the base plate and the top plate. In FIG. 1, there are four side supports along each side of the pressing unit that extend between the generally rectangular base plate and the generally rectangular top plate. The side supports, the base plate, and the top plate define an interior portion of the pressing unit. The dimensions of the interior portion of the pressing unit are selected to provide clearance between the bottom surface of the top plate of the pressing unit and a top surface of a press bar 110 positioned on a field pole, pole body, or pole coil located on cart 104 on track 106. This allows the cart carrying the press bar and the field pole, pole body, or pole coil to easily enter and exit the interior portion of the pressing unit.

The pressing unit 112 may include a hydraulic control system that is connected to the hydraulic cylinders and that provides a user interface for controlling the hydraulic cylinders.

The track 106 extends through the interior portion of the pressing unit over the base plate. The hydraulic cylinders are located on a top surface of the base plate between the parallel tracks. FIG. 2 illustrates an example with 12 hydraulic cylinders where pairs of cylinders are evenly spaced between the parallel tracks along a length of the track extending through the interior portion of the pressing unit.

The hydraulic cylinders may be arranged in the pressing unit 112 so that they are directly under a pole body when a cart carrying a field pole or a pole body is positioned inside the pressing unit. This positioning directs the force from the cylinders into straightening the pole body instead of bending the press cart.

In one aspect of the invention, the pressing unit may press the pole body separated from the pole coil. The field pole is removed from the rotor and then the pole body is separated from the pole coil. FIGS. 1 and 2 illustrate a cart 104 carrying a pole body 102 separated from a pole coil. The pole body includes attachment pieces 204a, 204b that extend from a surface of the pole body. The attachment pieces attach the field pole to the rotor. Two press bars 206a, 206b are placed on the surface of the pole body with the attachment pieces so that the attachment pieces are between the two press bars. If the pole body is configured with only one attachment piece, then the press bars are placed on either side of the attachment piece. The press bars may be sized to contact as much of the pole body as possible to evenly distribute the pressure to the pole body.

Figure 3A:
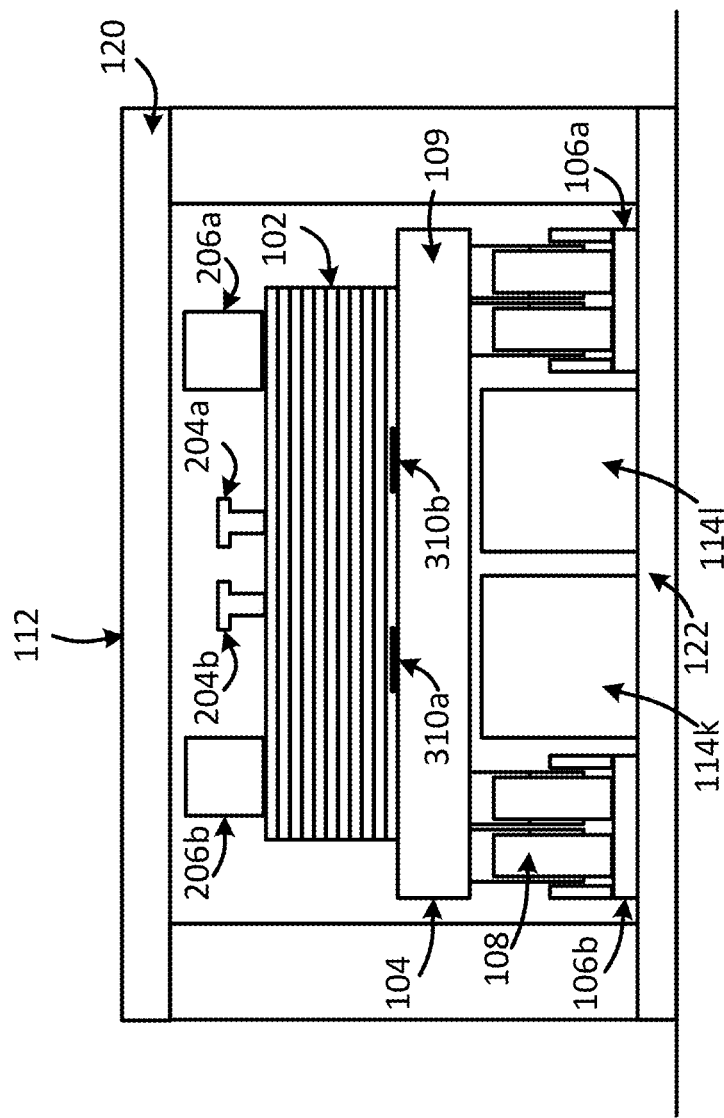
FIG. 3A is an end view of an exemplary pressing unit with a press cart carrying a pole body located in an interior portion of the pressing unit, in accordance with an aspect of the present disclosure.

FIG. 3A illustrates an end view of the pressing unit 112. The cart 104, pole body 102, and the press bars 206a, 206b of FIGS. 1 and 2 are shown positioned in the interior portion of the pressing unit. The press bars 206a, 206b extend past an upper surface of the attachment pieces 204a, 204b when the press bars are positioned on the pole body. The press bars may be tubes with a rectangular or square cross section, as shown in FIG. 3A. The wheels of the cart contact the base portion of the track and each set of wheels is located between the side portions of the tracks. Two of the hydraulic cylinders are visible in the figure. All of the hydraulic cylinders are located between the parallel tracks and below the lower surface of the cart.

Figure 3B:
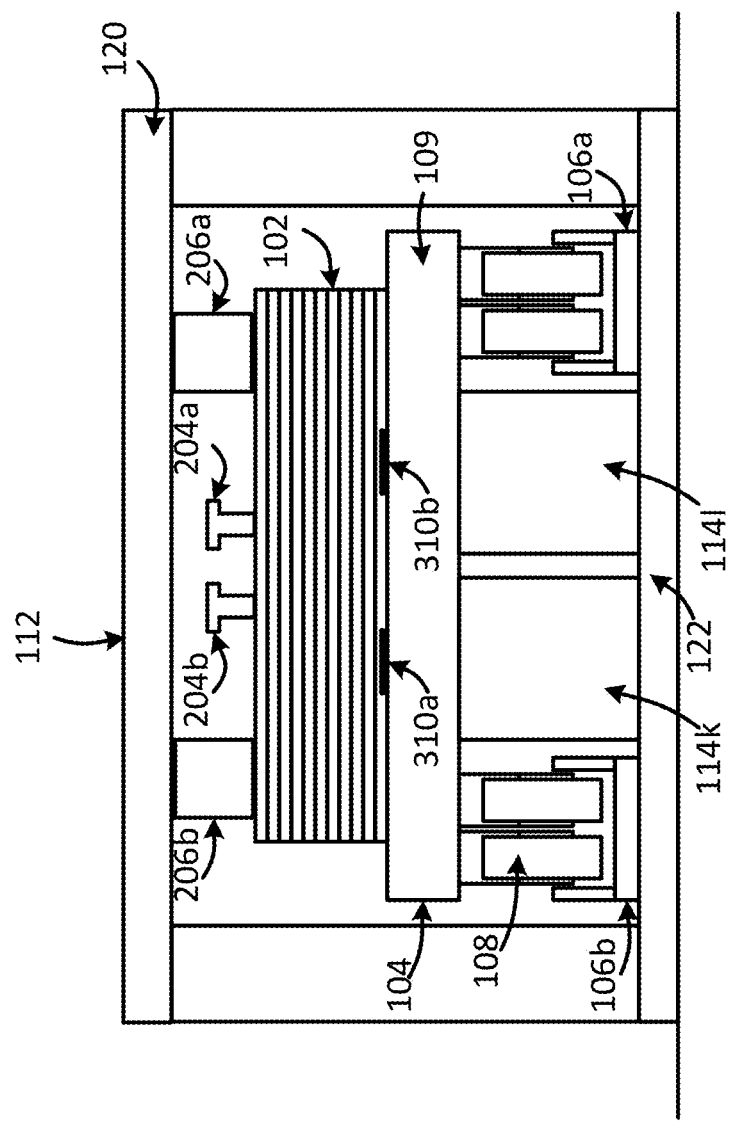
FIG. 3B is an end view of the exemplary pressing unit of FIG. 3A during pressing of the pole body, in accordance with an aspect of the present disclosure.

The hydraulic cylinders 114 can be controlled using the hydraulic control system to use pressurized hydraulic fluid to apply force upwards to the lower surface of the cart. FIG. 3B illustrates the application of force by the hydraulic cylinders to the cart. The force presses the press bars and the pole body between the lower surface of the top plate of the pressing unit and the upper surface of the cart. The pressing time may vary depending upon the state of the pole body.

In some situations, one or more spacers or shims 310a, 310b may be placed between the upper surface of the cart and the pole body. The spacers may be placed proximate to an area of fanning in the pole body and may serve as a pivot point for the straightening. The spacers allow the pressing unit 112 to press the pole body beyond a point where the layers of the pole body are parallel to the upper surface of the press cart 104. After the pressing unit 112 finishes pressing the pole body, the layers of the pole body may relax into a state of being parallel to the upper surface of the press cart 104.

Depending upon the condition of the pole body, the pressing process may be repeated, the pressing time may be extended, and/or additional spacers may be used. In one implementation, the pole body is pressed until a straightness of 0.056" is achieved, which corresponds to an industry standard based on the size of the unit. A precision straight edge may be used to measure the straightness. Feeler gauges are used to measure any gaps between the straight edge and the pole body. The straightness may be measured after the cart is moved out of the pressing unit or while the cart is still in the pressing unit.

Figure 4:
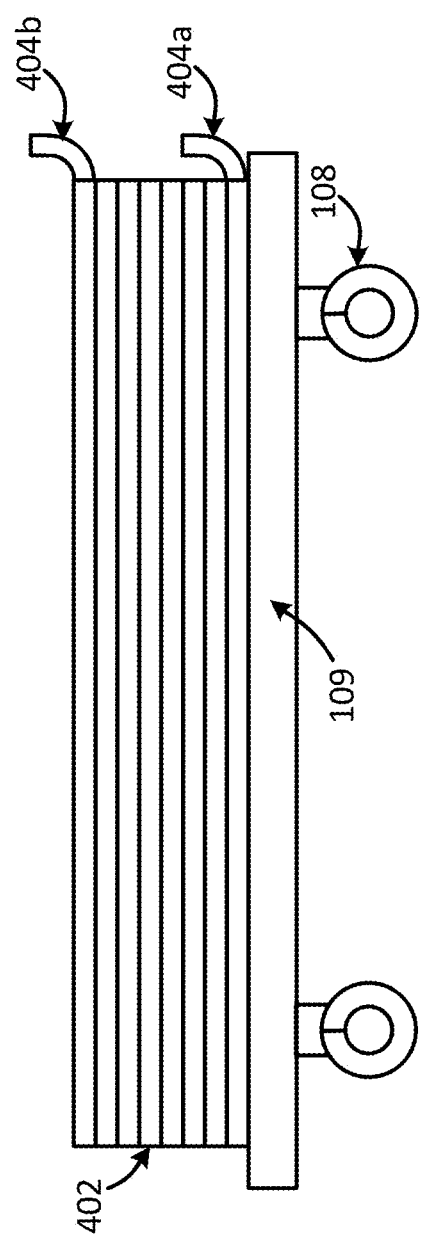
FIG. 4 is a side view of an exemplary press cart carrying a pole coil, in accordance with an aspect of the present disclosure.
Figure 5:
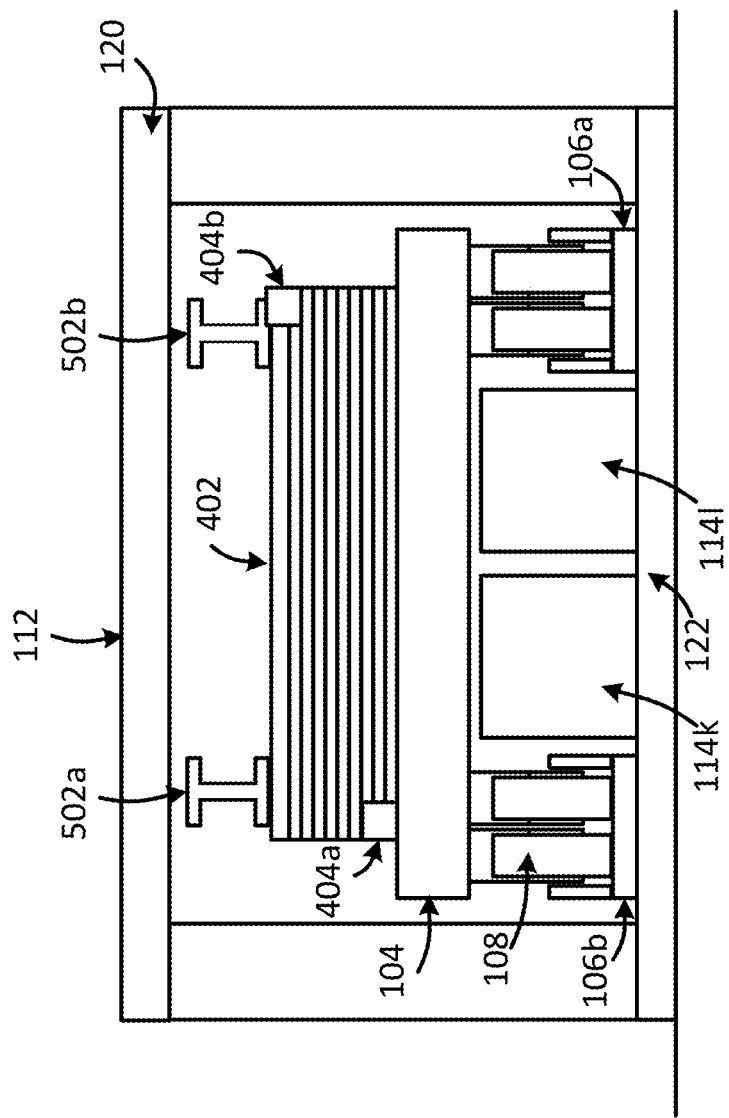
FIG. 5 is an end view of an exemplary pressing unit with the press cart of FIG. 4 located in an interior portion of the pressing unit, in accordance with an aspect of the present disclosure.

In another aspect of the invention, the pressing unit presses a pole coil separated from a pole body. FIGS. 4 and 5 illustrate a press cart 104 carrying a pole coil 402 separated from a pole body. The press bars 502a, 502b used to press a pole coil may be the same or may be different than those used to press a pole body separated from a pole coil. FIG. 5 illustrates two press bars each in the shape of an I-beam. In other implementations the press bar includes an I-beam mounted to a base plate and the base plate is in contact with the pole coil. The press bars are placed along the lateral sides of the pole coil. FIGS. 4 and 5 illustrate the connector pieces 404a, 404b of the pole coil extending upwards from an end of the pole coil when the pole coil is on the press cart. The press bars are positioned so that they do not contact the connector pieces.

FIG. 5 illustrates an end view of the pressing unit 112 after a cart carrying a pole coil separated from the pole body and press bars is positioned in the interior portion of the pressing unit. Similar to FIG. 3A, the wheels of the cart contact the base portion of the track and each set of wheels is located between the side portions of the tracks. Two of the hydraulic cylinders are shown. They are located between the parallel tracks and below the lower surface of the cart. When the hydraulic cylinders apply force to the cart, the force presses the press bars and the pole coil between the lower surface of the top plate and the upper surface of the cart so the upper surfaces of the press bars are in contact with the lower surface of the top plate.

Depending upon the condition of the pole coil, the pressing process may be repeated, the pressing time may be extended, and/or spacers may be added. In one implementation, the pole coil is pressed until a straightness of 0.030" is achieved, which represents a tighter straightness tolerance than that used for the pole body.

After pressing a pole body separated from a pole coil and/or a pole coil separated from a pole body, the body and coil are reassembled and the field pole is reinstalled on the rotor.

Figure 6:
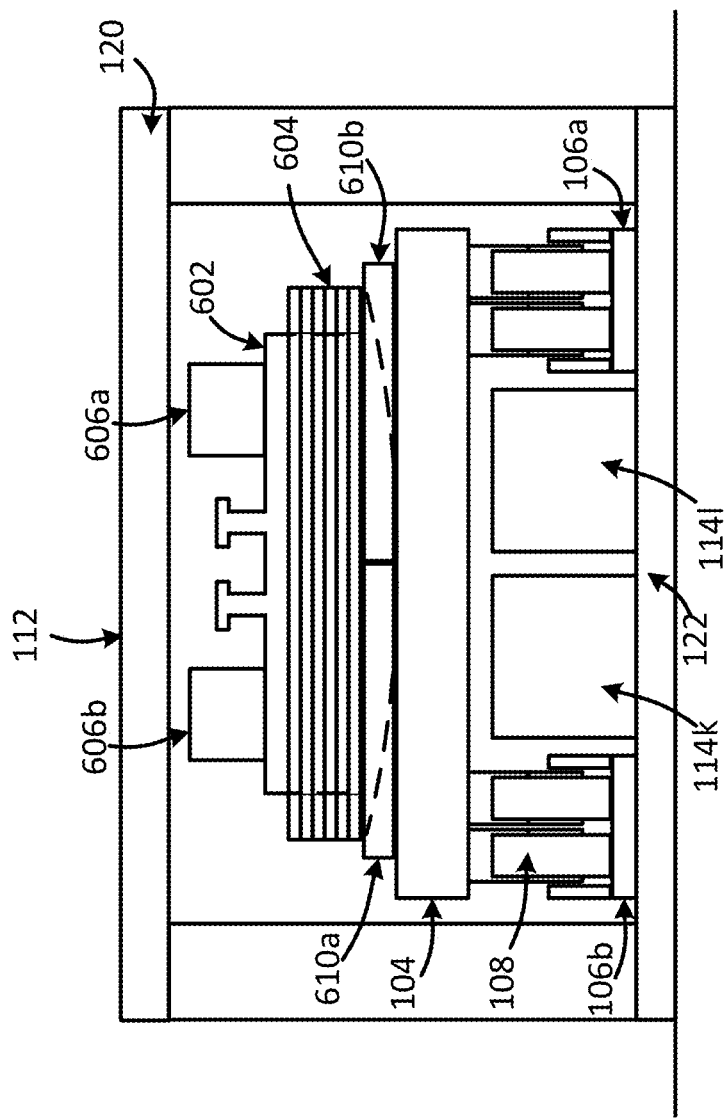
FIG. 6 is an end view of an exemplary pressing unit with a press cart carrying a field pole located in an interior portion of the pressing unit, in accordance with an aspect of the present disclosure.

In yet another aspect of the invention, the pressing unit presses a field pole without separating the pole body and the pole coil. FIG. 6 illustrates a press cart 104 carrying a field pole 602 where the pole body and pole coil remain joined. The press bars 606a, 606b used to press a field pole may be similar to those used to press a pole body. FIG. 6 illustrates two press bars 606a, 606b. The press bars are positioned on an upper surface of the field pole so that the attachment pieces are between the press bars. Each press bar extends upwards past an upper surface of the attachment pieces when the press bars are positioned on the upper surface of the field pole. The press bars may be tubes with a rectangular or square cross section, as shown.

FIG. 6 illustrates an end view of the pressing unit 112 after the press cart is positioned in the interior portion of the pressing unit. When the hydraulic cylinders apply force to the cart, the force presses the press bars and the field pole between the lower surface of the top plate and the upper surface of the cart.

In some field poles, the pole coil may extend past an end of the pole body so that a space formed between the lower surface of the pole coil and the upper surface of the cart. One or more supports 610a, 610b may be positioned in the space between the cart and the portion of the coil that extends past the end of the pole body. Although not shown in FIG. 6, additional spacers may be placed between the press cart and the pole coil to account for the greater "spring back" of the copper pole coil over the steel pole body.

Depending upon the condition of the field pole, the pressing process may be repeated, the pressing time may be extended, and/or spacers may be added. Spacers may be used to press the pole coil with additional force since the copper coil may exhibit greater spring back compared to the steel body. In one implementation, the field pole coil is pressed until a straightness of 0.030" is achieved.

In some instances, the method may include multiple pressings of the field pole where the press bars are moved between the pressings. For example, a first pressing may be conducted with the press bars in a first position. The press bars may be moved to a second position and a second pressing may be conducted. The first position may be on a surface of the pole body inside the pole coil and the second position may be on a surface of the pole coil.

In other instances, the method may begin with pressing a field pole with the pole body and pole coil remaining joined together. If the desired straightness is achieved, then the pressing is complete. However, if the desired straightness is not achieved, then the pole body and the pole coil may be separated and one or both of the pole body and the pole coil may be separately pressed. The pressings are not limited to the pressing of a field pole followed by the pressing of a pole body and/or pole coil. The pressings may include any combination of pressings in any order.

Figure 7:
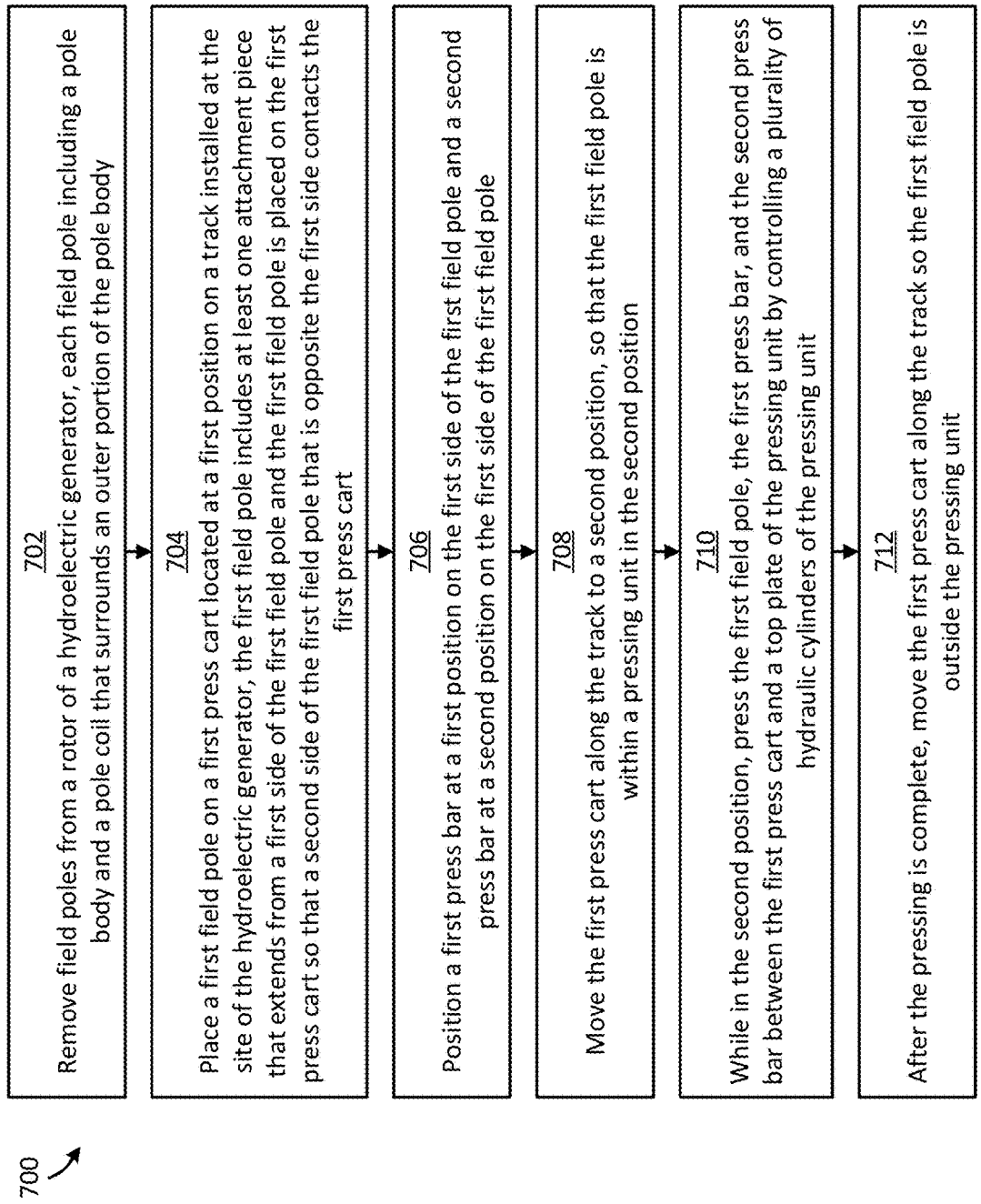
FIG. 7 is a flow diagram of an exemplary method for pressing field poles using a pressing assembly located at a site of a hydroelectric generator, in accordance with an aspect of the present disclosure.

FIG. 7 is a flow diagram showing an exemplary method 700 for on-site pressing of field poles for a hydroelectric generator. In block 702, the field poles are removed from a rotor of the hydroelectric generator. Each of the field poles includes a pole body and a pole coil that surrounds an outer portion of the pole body.

In block 704, a first field pole is placed on a first press cart located at a first position on a track installed at the site of the hydroelectric generator. The first field pole includes at least one attachment piece that extends from a first side of the first field pole. The first field pole is placed on the first press cart so that a second side of the first field pole that is opposite the first side contacts the first press cart.

In block 706, a first press bar and a second press bar are positioned on the first side of the first field pole. At block 708, the first press cart is moved along the track to a second position, so that the first field pole is within an interior portion of the pressing unit in the second position. Spacers, supports, shims, etc. may be positioned between the press cart and the first field pole to fill in gaps or to assist in the straightening of the field pole.

At block 710, while in the second position, the first field pole, the first press bar, and the second press bar are pressed between the first press cart and a top plate of the pressing unit by controlling a plurality of hydraulic cylinders of the pressing unit. The hydraulic cylinders may be mounted on a base plate of the pressing unit, and may be located in between parallel tracks that form the track. The hydraulic cylinders exert upwards force to the bottom of the first press cart, causing the first press bar and the second press bar to contact the top plate of the pressing unit. The pressing may be repeated as needed to obtain a desired straightness of the first field pole.

At block 712, after the pressing is complete and the desired straightness is achieved, the first press cart is moved along the track so that the first field pole is outside the pressing unit. The first field pole can be removed from the first press cart and be reinstalled into the rotor assembly in the hydroelectric generator. Additional field poles can be placed on additional press carts so that multiple field poles may be processed as quickly and efficiently as possible.

Although FIG. 7 illustrates a method for pressing a field pole, similar methods may be used to press a pole body separated from a pole coil or a pole coil separated from a pole body.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A method for pressing a plurality of field poles at a site of a hydroelectric generator with a pole pressing assembly having:
   a pressing unit including a top plate, a base plate, a plurality of hydraulic cylinders mounted on the base plate, and a hydraulic control system;
   a pair of tracks formed by a first track and a second track, wherein a first portion of the pair of tracks is positioned outside the pressing unit, a second portion of the pair of tracks is positioned over the base plate of the pressing unit, and a third portion of the pair of tracks is positioned outside the pressing unit on an opposite side of the pressing unit from the first portion of the pair of tracks;
   at least one cart that is moveable along the pair of tracks and is configured to transport a field pole; and
   a first press bar and a second press bar, wherein the first press bar is configured to extend along a first portion of the field pole and the second press bar is configured to extend along a second portion of the field pole,
   wherein the hydraulic cylinders are positioned between the first track and the second track such that when the cart is positioned within the pressing unit the hydraulic control system is configured to control the hydraulic cylinders to raise the cart off the second portion of the pair of tracks and press the field pole against an inner surface of the top plate;
   the method comprising:
   removing a plurality of field poles from a rotor of a hydroelectric generator, wherein each of the field poles has a pole body and a pole coil that surrounds an outer portion of the pole body;
   placing a first one of the field poles on a first one of the at least one cart located at a first position on the pair of tracks installed at the site of the hydroelectric generator, wherein the first one of the field poles includes at least one attachment piece that extends from a first side of the first one of the field poles and the first one of the field poles is placed on the first one of the at least one cart so that a second side of the first one of the field poles that is opposite the first side contacts the first one of the at least one cart;
   positioning the first press bar at a first position on the first side of the first one of the field poles and the second press bar at a second position on the first side of the first one of the field poles;
   moving the first one of the at least one cart along the pair of tracks to a second position, wherein the first one of the field poles is within the pressing unit in the second position, the pressing unit is installed at the site of the hydroelectric generator, and the pair of track extends into the pressing unit;
   while in the second position, pressing the first one of the field poles, the first press bar, and the second press bar between the first one of the at least one cart and a top plate of the pressing unit by controlling the plurality of hydraulic cylinders of the pressing unit; and
   after the pressing is completed, moving the first one of the at least one cart along the pair of tracks so the first one of the field poles is outside the pressing unit.

2. The method of claim 1, wherein positioning the first press bar at the first position on the first side of the first one of the field poles and the second press bar at the second position on the first side of the first one of the field poles comprises positioning the first press bar along a first edge portion of the first one of the field poles so the first press bar partially contacts a first portion of the pole coil and positioning the second press bar along a second edge portion of the first one of the field poles so the second press bar partially contacts a second portion of the pole coil.

3. The method of claim 1, further comprising:
   positioning a support between the first one of the at least one cart and a surface of the pole coil facing the first one of the at least one cart, wherein the support is proximate to an end of the pole body.

4. The method of claim 3, further comprising:
   positioning at least one spacer between the first one of the at least one cart and a portion of the support.

5. The method of claim 4, wherein the first one of the field poles includes a fanned portion of the pole body, and positioning at least one spacer comprises positioning the at least one spacer proximate the fanned portion.

6. The method of claim 1, wherein the pole body includes a plurality of layers, and pressing the first one of the field poles, the first press bar, and the second press bar comprises continuing to press the first one of the field poles beyond a point where the layers are parallel to the first one of the at least one cart.

7. The method of claim 1, further comprising:
placing a second one of the field poles on a second one of the at least one cart located at the first position on the pair of tracks installed at the site of the hydroelectric generator, wherein the second one of the field poles includes at least one attachment piece that extends from a first side of the second one of the field poles and the second one of the field poles is placed on the second one of the at least one cart so that a second side of the second one of the field poles that is opposite the first side contacts the second one of the at least one cart;
positioning the first press bar at a first position on the first side of the second one of the field poles and the second press bar at a second position on the first side of the second one of the field poles, wherein the positions of the first press bar and the second press bar differ from the positions used for the first one of the field poles;
moving the second one of the at least one cart along the pair of tracks to the second position, wherein the second one of the field poles is within the pressing unit in the second position; and
while in the second position, pressing the second one of the field poles, the first press bar, and the second press bar between the second one of the at least one cart and the top plate of the pressing unit by controlling a plurality of hydraulic cylinders of the pressing unit.

8. A method for pressing a plurality of field poles at a site of a hydroelectric generator with a pole pressing assembly having:
a pressing unit including a top plate, a base plate, a plurality of hydraulic cylinders mounted on the base plate, and a hydraulic control system;
a pair of tracks formed by a first track and a second track, wherein a first portion of the pair of tracks is positioned outside the pressing unit, a second portion of the pair of tracks is positioned over the base plate of the pressing unit, and a third portion of the pair of tracks is positioned outside the pressing unit on an opposite side of the pressing unit from the first portion of the pair of tracks;
at least one cart that is moveable along the pair of tracks and is configured to transport a field pole; and
a first press bar and a second press bar, wherein the first press bar is configured to extend along a first portion of the field pole and the second press bar is configured to extend along a second portion of the field pole,
wherein the hydraulic cylinders are positioned between the first track and the second track such that when the cart is positioned within the pressing unit the hydraulic control system is configured to control the hydraulic cylinders to raise the cart off the second portion of the pair of tracks and press the field pole against an inner surface of the top plate;
the method, comprising:
removing a plurality of field poles from a rotor of a hydroelectric generator, wherein each of the field poles has a pole body and a pole coil that surrounds an outer portion of the pole body;
separating a first field pole body and a first pole coil from a first field pole;
placing the first field pole body on a first one of the at least one cart located at a first position on the pair of tracks installed at the site of the hydroelectric generator, wherein the first field pole body includes at least one attachment piece that extends from a first side of the first field pole body and the first field pole body is placed on the first one of the at least one cart so that a second side of the first field pole body that is opposite the first side contacts the first one of the at least one cart;
positioning the first press bar at a first position on one side of the at least one attachment piece on the first side of the first field pole body and the second press bar on an opposite side of the at least one attachment piece on the first side of the first field pole body;
moving the first one of the at least one cart along the pair of tracks to a second position, wherein the first field pole body is within the pressing unit in the second position, the pressing unit is installed at the site of the hydroelectric generator, and the pair of tracks extends into the pressing unit;
while in the second position, pressing the first field pole body, the first press bar, and the second press bar between the first one of the at least one cart and a top plate of the pressing unit by controlling the plurality of hydraulic cylinders of the pressing unit; and
after the pressing is completed, moving the first one of the at least one cart along the pair of tracks so the first field pole body is outside the pressing unit.

9. The method of claim 8, further comprising:
placing the first pole coil on a second one of the at least one cart on the pair of tracks;
positioning a third press bar at the first position on one side of a first side of the first pole coil and a fourth press bar on an opposite side of the first side of the first pole coil;
moving the second one of the at least one cart along the pair of tracks to the second position, wherein the first pole coil is within the pressing unit in the second position;
while in the second position, pressing the first pole coil, the third press bar, and the fourth press bar between the second one of the at least one cart and the top plate of the pressing unit by controlling the hydraulic cylinders of the pressing unit;
after the pressing is completed, moving the second one of the at least one cart along the pair of tracks so the first pole coil is outside the pressing unit; and
re-assembling the first pole coil and the first field pole body.

10. The method of claim 9, wherein the first press bar and the second press bar both have a rectangular cross-section and the third press bar and the fourth press bar are both I-beams.

11. The method of claim 10, wherein the first field pole body includes a fanned portion, and positioning at least one spacer comprises positioning the at least one spacer proximate the fanned portion.

12. The method of claim 11, wherein pressing the first field pole body, the first press bar, and the second press bar comprises continuing to press the first field pole body beyond a point where the first field pole body is parallel to the first one of the at least one cart.

13. The method of claim 12, wherein the first pole coil includes a plurality of coils, and pressing the first pole coil, the third press bar, and the fourth press bar comprises continuing to press the first pole coil beyond a point where the coils are parallel to the first one of the at least one cart.

14. A pole processing assembly installed at a site of a hydroelectric generator, comprising:

a pressing unit including a top plate, a base plate, a plurality of hydraulic cylinders mounted on the base plate, and a hydraulic control system;

a pair of tracks formed by a first track and a second track, wherein a first portion of the pair of tracks is positioned outside the pressing unit, a second portion of the pair of tracks is positioned over the base plate of the pressing unit, and a third portion of the pair of tracks is positioned outside the pressing unit on an opposite side of the pressing unit from the first portion of the pair of tracks;

at least one cart that is moveable along the pair of tracks and is configured to transport a field pole; and a first press bar and a second press bar, wherein the first press bar is configured to extend along a first portion of the field pole and the second press bar is configured to extend along a second portion of the field pole, wherein the hydraulic cylinders are positioned between the first track and the second track such that when the cart is positioned within the pressing unit the hydraulic control system is configured to control the hydraulic cylinders to raise the cart off the second portion of the pair of tracks and press the field pole against an inner surface of the top plate.

15. The pole processing assembly of claim 14, wherein the hydraulic cylinders are arranged in the pressing unit in a plurality of rows, each row having at least two hydraulic cylinders and the rows spaced from one end of the pressing unit to a second end of the pressing unit.

16. The pole processing assembly of claim 14, wherein the first press bar and the second press bar are both I-beams or rectangular tubes.

* * * * *